United States Patent
Iwagami et al.

(10) Patent No.: US 7,538,587 B2
(45) Date of Patent: May 26, 2009

(54) POWER SEMICONDUCTOR DEVICE

(75) Inventors: Toru Iwagami, Tokyo (JP); Shinya Shirakawa, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 0 days.

(21) Appl. No.: 11/269,561

(22) Filed: Nov. 9, 2005

(65) Prior Publication Data

US 2006/0113838 A1    Jun. 1, 2006

(30) Foreign Application Priority Data

Nov. 10, 2004    (JP) .............................. 2004-326042
Oct. 4, 2005    (JP) .............................. 2005-290996

(51) Int. Cl.
*H03B 1/00*    (2006.01)

(52) U.S. Cl. ....................................... 327/108; 327/110

(58) Field of Classification Search ......... 327/108–112, 327/376, 377, 423, 424, 432, 433, 434, 478, 327/491; 363/56.03, 56.04, 56.06, 56.07
See application file for complete search history.

(56) References Cited

U.S. PATENT DOCUMENTS

| | | | | |
|---|---|---|---|---|
| 4,414,479 A | * | 11/1983 | Foley | 327/483 |
| 4,556,825 A | * | 12/1985 | Thomas | 315/408 |
| 4,855,799 A | * | 8/1989 | Tanabe et al. | 257/341 |
| 5,013,926 A | * | 5/1991 | Aizawa | 250/551 |
| 5,089,719 A | | 2/1992 | Kamei et al. | |
| 5,793,623 A | | 8/1998 | Kawashima et al. | |
| 5,929,665 A | * | 7/1999 | Ichikawa et al. | 327/109 |
| 5,969,964 A | * | 10/1999 | Mangtani | 363/132 |
| 5,998,227 A | * | 12/1999 | Pelly | 438/14 |
| 5,998,884 A | * | 12/1999 | Kitamine et al. | 307/10.1 |
| 6,018,467 A | * | 1/2000 | Majid et al. | 363/16 |
| 6,486,627 B1 | * | 11/2002 | Gabrys | 318/161 |
| 6,532,810 B1 | * | 3/2003 | Ahmed | 73/119 R |
| 6,593,781 B2 | * | 7/2003 | Yoshimura | 327/110 |
| 6,717,828 B2 | | 4/2004 | Iwagami et al. | |
| 6,781,423 B1 | * | 8/2004 | Knoedgen | 327/110 |
| 6,967,378 B2 | | 11/2005 | Nishikawa et al. | |
| 2003/0076696 A1 | * | 4/2003 | Tsai | 363/37 |

(Continued)

FOREIGN PATENT DOCUMENTS

JP    3-117211    5/1991

(Continued)

*Primary Examiner*—Donovan Lincoln
*Assistant Examiner*—Thomas J Hiltunen
(74) *Attorney, Agent, or Firm*—Buchanan Ingersoll & Rooney PC

(57) ABSTRACT

A power semiconductor device has first and second power switching elements connected in series, with flywheel diodes, and first and second driver circuits connected to gates of the first and second power switching semiconductor elements. Further, a second diode is connected to a line to be connected to a terminal of at least one of the first and second driver circuits in forward direction such that a current does not flow in the line from the terminal through the second diode. For example, the second diode is connected between a power source terminal of the driver circuit and a controlled power source. In another example, the second diode is connected between an input terminal of the driver circuit and a device for supplying a control signal to the input terminal.

26 Claims, 5 Drawing Sheets

U.S. PATENT DOCUMENTS

| | | | |
|---|---|---|---|
| 2004/0134468 A1* | 7/2004 | Yamazaki | 123/499 |
| 2005/0116744 A1* | 6/2005 | Iwagami et al. | 327/108 |
| 2005/0258792 A1* | 11/2005 | Matsuda et al. | 318/432 |

FOREIGN PATENT DOCUMENTS

| | | |
|---|---|---|
| JP | 4-8173 | 1/1992 |
| JP | 7-297695 | 11/1995 |
| JP | 11-205112 | 7/1999 |
| JP | 11-308084 | 11/1999 |
| JP | 2003-309982 | 10/2003 |
| KR | 0149289 B | 11/1998 |
| KR | 100245641 B1 | 11/1999 |
| KR | 1020000027741 A | 5/2000 |
| KR | 1020040077510 A | 9/2004 |

* cited by examiner

US 7,538,587 B2

POWER SEMICONDUCTOR DEVICE

BACKGROUND OF THE INVENTION

The invention relates to a power semiconductor device, and in particular, to suppression of surge occurring in the power semiconductor device.

Power semiconductor devices including power semiconductors are used widely. A power module is a package incorporating a plurality of power semiconductor elements such as metal oxide semiconductor field effect transistors (MOSFET) or insulated gate bipolar transistors (IGBT) with peripheral circuits therefor. Its advantages are its compact size due to the integration and easy wiring. Thus, power modules are used in many purposes.

It is required for a power semiconductor device to prevent a bad influence due to surge. For example, a driver for power semiconductor elements in an inverter circuit, disclosed in Japanese Patent laid open Publication No. 7-297695/1995, includes a protection circuit for preventing overheating. Such a protection circuit may malfunction due to a sharp current change on reverse recovery of a flywheel diode provided for the power semiconductor element. Then, in order to prevent such a malfunction, a controller, having a common output terminal for sending an alarm signal when a surge current or a short-circuit current happens, connects a Schottky diode between a common output terminal of a controller for a lower arm and a power source terminal, so that a current flowing in a reverse direction is prevented in a circuit board of the controller. Alternatively, a capacitor is connected between the common output terminal of the controller circuit and the ground terminal, to prevent fluctuations of the reference voltage in the circuit board of the controller.

When a power semiconductor device is used, a peripheral circuit such as a gate driver or a photo-coupler, or an external signal generator such as a microprocessor for supplying a control signal to a gate driver may be broken due to surge current or voltage generated in the power semiconductor device. However, for example, the above-mentioned inverter cannot block the surge voltage or current, or cannot prevent the bad influence to a device connected to the power semiconductor device. Then, a surge voltage in the inverter circuit may be applied to or a surge current in the inverter circuit may flow to a peripheral device, and in such a case the peripheral device may be broken, or an electric loss increases.

SUMMARY OF THE INVENTION

An object of the invention is to provide a power semiconductor device which can suppress a failure of a peripheral circuit or an external circuit due to a surge generated in the power semiconductor device.

In one aspect of the invention, a power semiconductor device according to the invention has a first power switching semiconductor element at high voltage side and a second power switching semiconductor element at low voltage side connected in series, and flywheel diodes each of which being connected in antiparallel to one of the first and second power switching semiconductor elements. Two ends of the switching semiconductor elements connected in series is connectable to an external direct current power source, and a connection point between the first and second power switching semiconductor elements can supply an output voltage. The device further has a first driver circuit connected to a gate of the first power switching semiconductor element, and a second driver circuit connected to a gate of the second power switching semiconductor element. Further, a second diode is connected to a line to be connected to a terminal of at least one of the first and second driver circuits in forward direction such that a current does not flow in the line from the terminal through the second diode.

In an example, the device has a controlled power source for the first and second driver circuits. The second diode is connected between the power source and a terminal which is a power source terminal of the at least one of the first and second driver circuits.

In another example, the terminal is an input terminal for receiving a control signal for the at least one of the first and second driver circuits. The second diode is connected between the input terminal and a device for supplying the control signal.

In a further example, the device has a photocoupler for supplying a control signal for the at least one of the first and second driver circuits. The terminal is an input terminal for receiving the control signal from the photocoupler, and the second diode is connected between the terminal and the photocoupler.

An advantage of the invention is that a failure of a peripheral circuit or an external circuit used for a power semiconductor device can be prevented because a surge voltage and current generated in the power semiconductor device is suppressed and is not transmitted to the external circuit.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
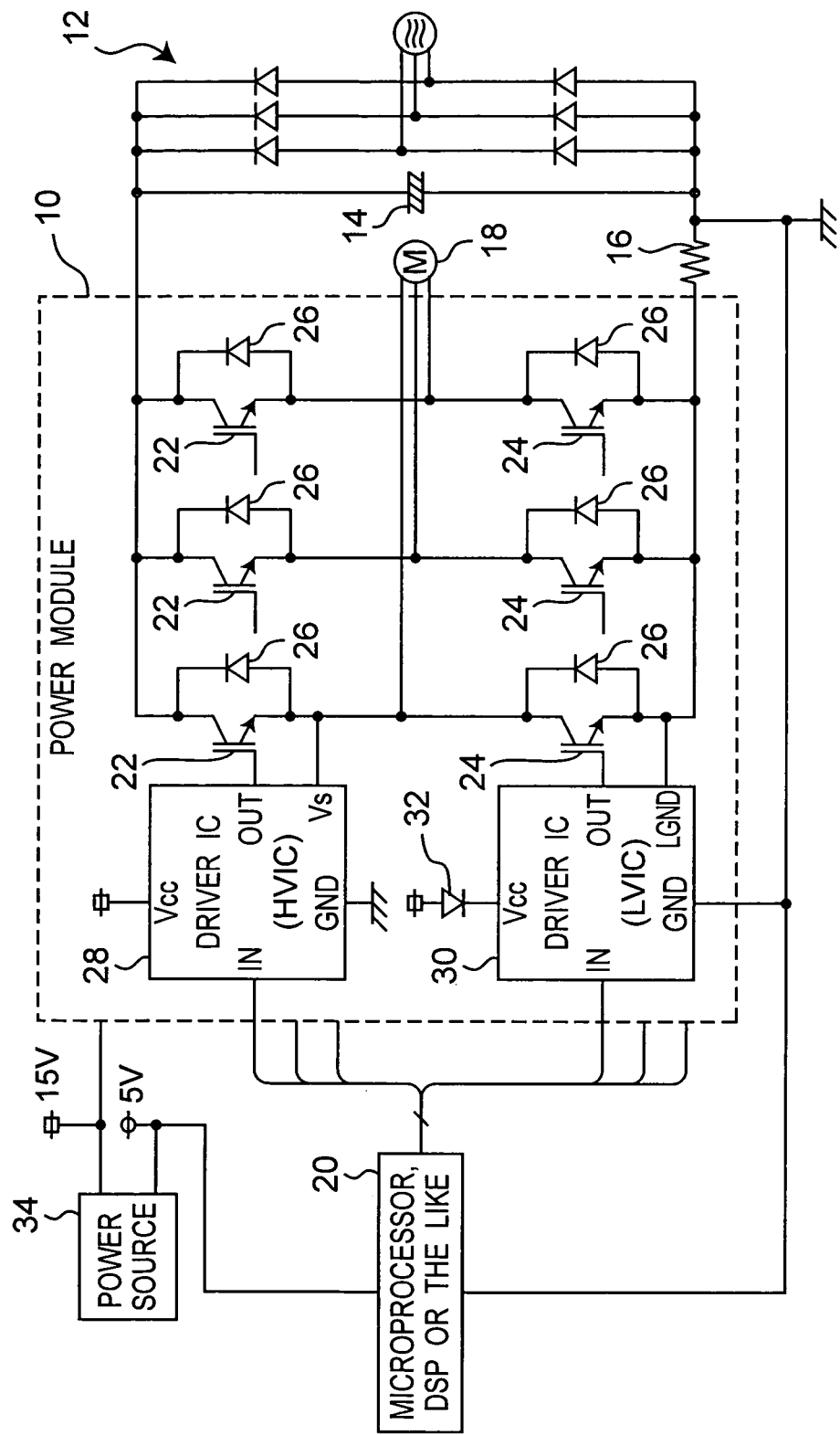
FIG. 1 is a driver circuit according to a first embodiment of the invention.

Referring now to the drawings, wherein like reference characters designate like or corresponding parts throughout the several views, FIG. 1 shows a three-phase motor driver circuit according to a first embodiment of the invention, wherein a power module 10 including power switching semiconductor elements (hereinafter referred to as power chips) 22, 24 is connected to a direct current power source which supplies a DC voltage to the power chips 22, 24. The DC power source includes a diode bridge rectifier circuit 12 and a smoothing capacitor 14. A microprocessor 20, a digital signal processor (DSP) or the like as an external signal generator supplies control signals for the power chips 22, 24, and the power module 10 generates a three-phase alternating current according to the control signals to drive a motor 18 as an example of an inductive load.

In the power module 10, three pairs of power chips 22 and 24 connected in series are connected between the upper and lower level sides of the smoothing capacitor 14. The power chips 22, 24 are for example power MOSFETs or IGBTs. A flywheel diode 26 is connected in antiparallel to each of the chips 22, 24. A higher arm, to be connected to the higher voltage side of the DC supply voltage, is constructed by three power chips 22 and the flywheel diodes 26 therefor, while a lower arm, to be connected to the lower voltage side of the DC supply voltage, is constructed by three power chips 24 and the flywheel diodes 26 therefor. Connection points between the power chips 22, 24 serve as output terminals U, V or W for the three-phase motor 18. A gate driver circuit is provided for the gate of each of the power chips 22, 24, and the microprocessor 20 provides a control signal to each gate driver circuit. The gate driver circuit may also be referred to as driver circuit, and it is a gate driver integrated circuit (IC) 28, 30 in this embodiment. A gate driver IC 28 is also referred to as HVIC, while a gate driver IC 30 is also referred to as LVIC. (The gate driver ICs 28, 30 are also connected to the gates of the power chips 22, 24 in the central and right pairs similarly to the left pair shown in FIG. 1, but they are not shown explicitly for the brevity of illustration in FIG. 1) The microprocessor 20 supplies the control signals to the gate driver ICs 28, 30, which in turn supply gate signals based on the control signals to the gates of the power chips 22, 24, and the power chips 22, 24 perform switching operation according to the gate signals. A known gate driver circuit may be used as the gate driver IC 28, 30. Further, a resistor 16 is provided between the lower arm and the lower level side of the DC power source in order to detect a current, and the voltage drop through the resistor 16 is determined to detect the surge current flowing in the lower arm. (In general, the gate driver ICs 28, 30 include a function for protecting the over-current based on the voltage drop at the resistor 16, but the explanation therefor is omitted here.) The microprocessor 20, the gate driver ICs 28, 30, and the resistor 16 at the side of the bridge 12 are connected commonly to the ground. Further, a controlled power source 34 is provided outside the power module 10 to supply, for example, 15 V of power supply voltage to the gate driver ICs 28, 30 and, for example, 5 V of power supply voltage to the microprocessor 20. The power module shown in FIG. 1 deals with a three-phase alternating current, but it is apparent for a person skilled in the art that a power module for a two-phase alternating current can be configured similarly by using only one pair of power chips 22, 24.

Each gate driver IC (LVIC) 30 in the lower arm is connected via a diode 32 of high breakdown voltage to the controlled power source 34 for the gate driver IC 30. That is, the diode 32 is connected between a power source terminal of each gate driver IC 30 and the controlled power source 34 in the forward direction so that a current does not flow through the diode 32 towards the controlled power source 34. A reason for using the diodes 32 is as follows. When the power chips 24 in the lower arm are turned off, a rapid current change occurs through the flywheel diodes 26 for backward recovery. For example, if one of the power chips 24 is destroyed by the current to open the emitter, or if the resistor 16 for detecting the current is opened, a surge voltage and a surge current occur in the circuit in the power module. Then, a high voltage is applied to the gate driver IC 30 which drives the power chip 24, and a high voltage is also applied to the controlled power source 34 for the gate driver IC 30 or to the microprocessor 20. This may destroy the controlled power source 34 for the gate driver ICs 30 or the microprocessor 20. Then, in order to prevent this failure, the diodes 32 of high breakdown voltage are inserted between the gate driver ICs 30 and its power source 34. Because of the insertion of the diodes 32 of high breakdown voltage, the surge voltage and the surge current occurring in the circuit of the power module 10 are blocked, so that the bad influence of the surge voltage and the surge current to the peripheral device can be decreased.

As explained above, because the diodes 32 are used to prevent that a high voltage from the DC power source is applied to the controlled power source 34 for the gate driver ICs 30 or to the microprocessor 20, the high breakdown voltage of the diodes 32 should be set larger than the voltage applied by the DC power source connected to the input side of the power module 10. For example, it is set to about the same as the breakdown voltage of the smoothing capacitor 14, say 600 V. This concept of the high breakdown voltage is common to the other embodiments explained later.

The structure of the lower arm including the power chips 24 and the gate driver ICs 30 is explained above for suppressing surge, but the power chips 22 in the higher arm may also damage a peripheral circuit of the driver circuit such as the controlled power source 34 or the microprocessor 20. That is, it may happen that a high voltage due to surge voltage and surge current generated in the power module 10 is applied to the gate driver ICs (HVIC) 28. On the other hand, because the gate driver ICs 28 in the higher arm have an internal high withstand voltage circuit, they are more resistant than the counterparts in the lower arm when a high voltage is applied. However, in order to prevent the influence on a peripheral circuit connected to the power module 10 substantially completely, it is desirable to connect the power source terminal of each gate driver IC 28 in the higher arm to the controlled power source 34 via a diode 32 of high breakdown voltage, similarly to the gate driver ICs 30 in the lower arm. Thus, the current does not flow towards the controlled power source 34.

Further, in this case, it is not necessary to use the diode 32 of high breakdown voltage to each individual power source terminal of the gate driver ICs 28 and 30. For example, the power source terminals of the gate driver ICs 28 and 30 are connected to each other, and they are connected to a common diode 32 to be connected further to the controlled power source 34 (refer to FIG. 5). Further, the diode 32 may be provided at either of the inside and the outside of the power module 10.

Figure 2:
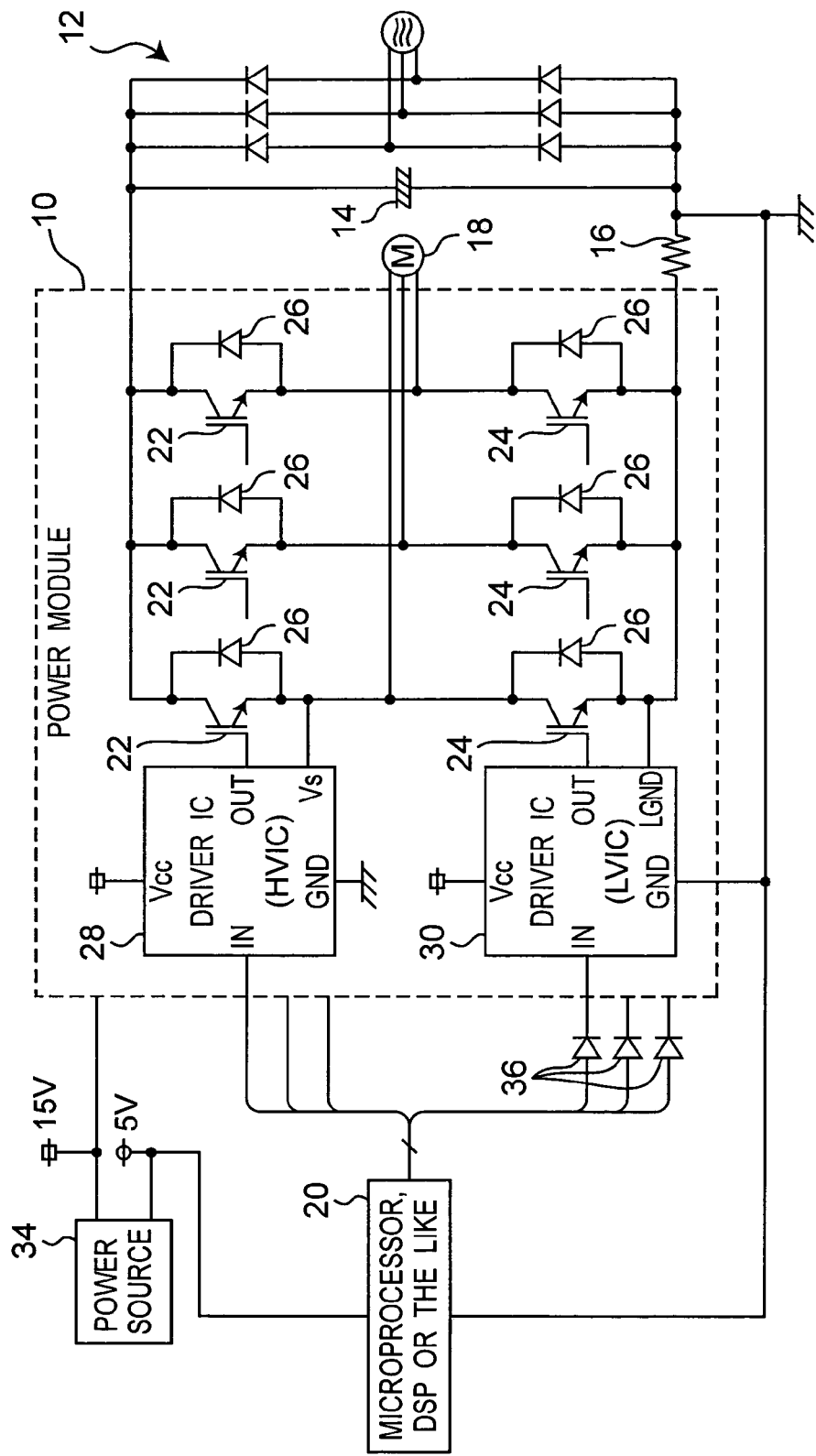
FIG. 2 is a driver circuit according to a second embodiment of the invention.

FIG. 2 shows another three-phase motor driver circuit according to a second embodiment of the invention. This driver circuit is different from that shown in FIG. 1 in that a diode 36 of high breakdown voltage is inserted in a line for inputting a control signal from the microprocessor 20 to an input terminal of each gate driver IC 30, instead of the diode 32 shown in FIG. 1 provided between each gate driver IC 30 and the controlled power source 34. The diode 36 is connected in the forward direction so that a current does not flow through the diode 36 towards the microprocessor 20. Thus, the surge voltage and the surge current in the circuit of the power module 10 are blocked, and the failure of the microprocessor 20 or the controlled power source 34 of the gate driver ICs 30 can be prevented.

Figure 5:
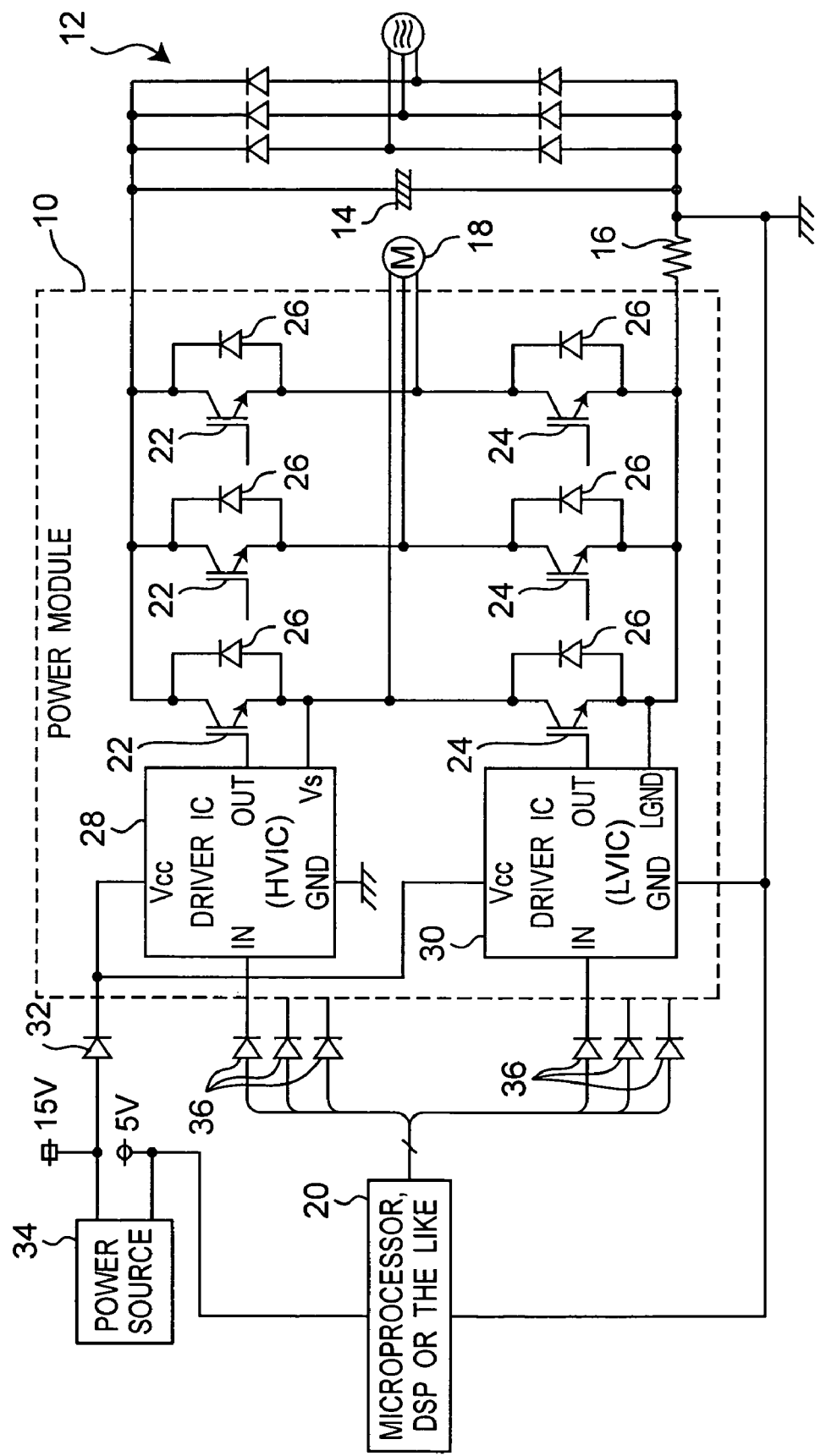
FIG. 5 is a driver circuit obtained by combining the first and second embodiments.

Further, it is desirable to insert diodes 36 of high breakdown voltage not only for the lines for inputting control signals from the microprocessor 20 to the gate driver ICs (LVIC) 30 in the lower arm, but also for lines for inputting control signals from the microprocessor 20 to the gate driver ICs (HVIC) 28 in the higher arm (refer to FIG. 5). Then, the influence of the surge voltage and surge current in the power module 10 to a peripheral circuit such as the controlled power source 34 or the microprocessor 20 can be prevented substantially completely. Further, the diodes 36 may be provided at either of the inside and the outside of the power module 10.

In the first and second embodiments of the invention, a line for inputting the control signal for each gate driver IC 28, 30 is connected via a resistor to the ground (or pull-downed) within the IC itself. However, the invention is not limited to the pull-down input signal lines.

Figure 3:
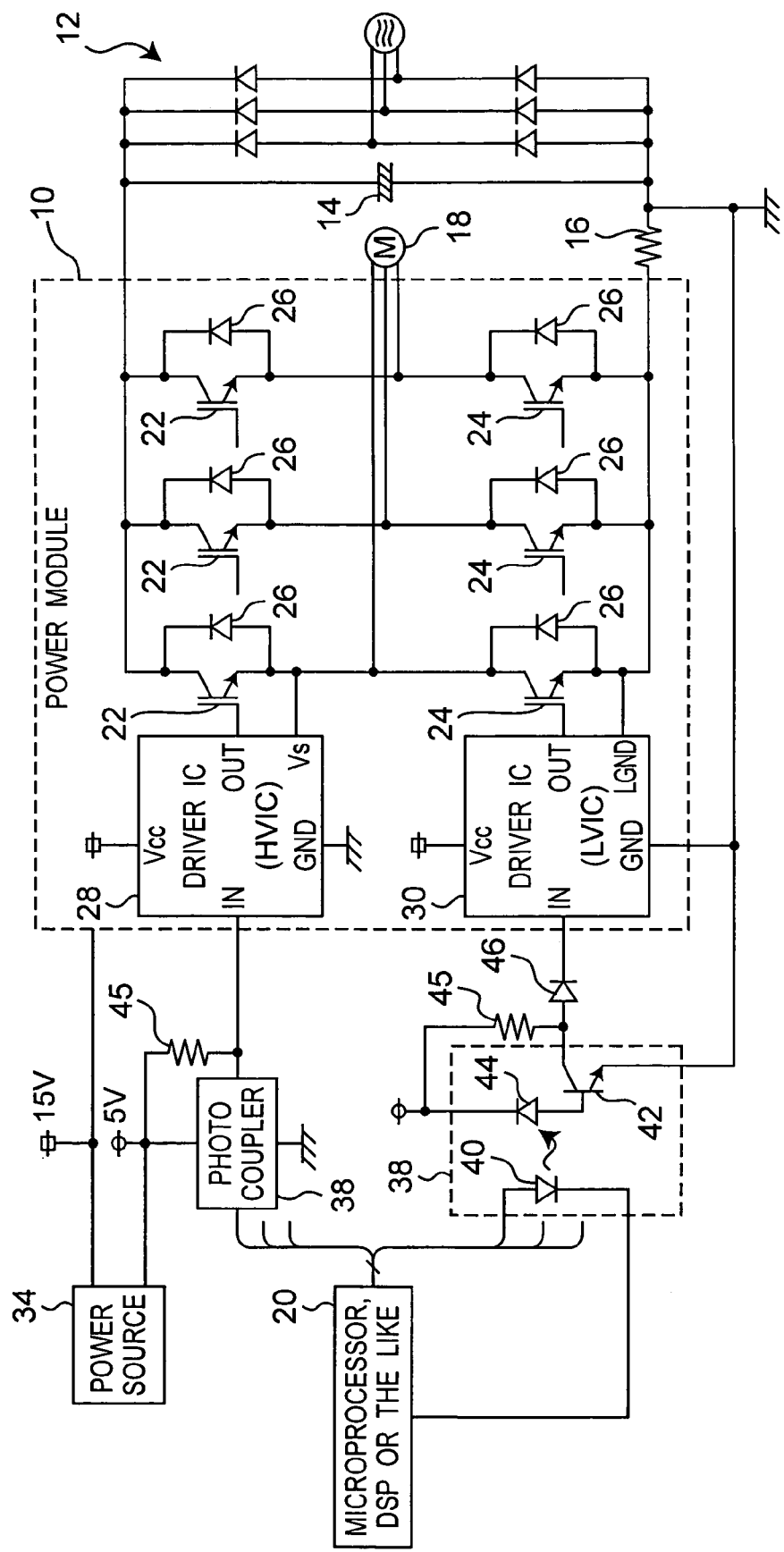
FIG. 3 is a driver circuit according to a third embodiment of the invention.

FIG. 3 shows a different three-phase motor driver circuit according to a third embodiment of the invention. This driver circuit is different from that shown in FIG. 1 in that photocouplers 38 are used to isolate the microprocessor 20 electrically from the power chips 22, 24. An output line from the microprocessor 20 is connected to a light-emitting element (diode) 40 in the photocoupler 38, while a light-receiving element (diode) 44 therein is connected in the backward direction between the controlled power source 34 and the base of a transistor 42. The collector of the transistor 42 is connected to the gate driver IC 30 and a pull-up resistor 45, which is connected between the collector of the transistor 42 and the controlled power source 34. The emitter of the transistor 42 is connected to the ground for the power module 10. In contrast to the driver circuit shown in FIG. 1, the diodes 32 of high breakdown voltage between the controlled power source 34 thereof and the gate driver IC 30 are not used.

In the driver circuit, for example, if one of the power chips 24 in the lower arm is destroyed to open the emitter, or if the resistor 16 for detecting the current is opened, a high voltage is applied to the gate driver IC 30 and to the photocoupler 38, and this may destroy the photocoupler 38. In order to prevent this failure, a diode 46 of high breakdown voltage are inserted between an input terminal of the gate driver IC 30 and the photocoupler 38 so as not to allow a current flow from each gate driver IC 30 via the input signal line to an output terminal of the photocoupler 38. Thus, the current does not flow to the photocoupler 38, and the failure of the photocoupler 38 can be prevented.

Further, it is desirable to insert a diode 46 of high breakdown voltage between a gate driver IC 28 and an output terminal of a photocoupler 38 for the higher arm as well as between each gate driver IC 30 and the output terminal of the photocoupler 38 for the lower arm. Then, the influence of the surge voltage and surge current in the power module 10 such as damage of photocoupler 38 to a peripheral circuit such as the photocoupler 38 can be prevented substantially completely.

Figure 4:
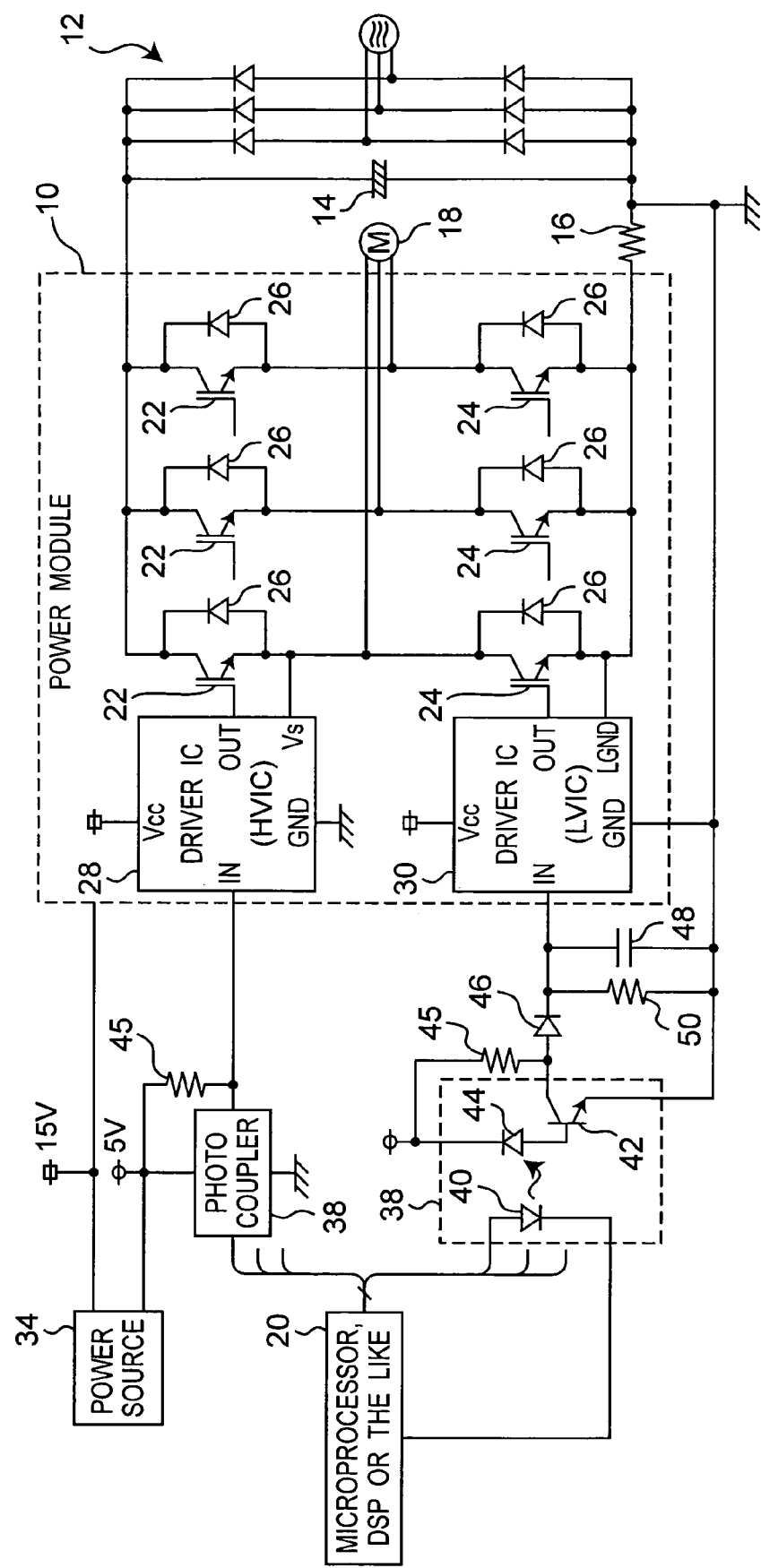
FIG. 4 is a driver circuit according to a fourth embodiment of the invention.

FIG. 4 shows a further three-phase motor driver circuit according to a fourth embodiment of the invention. In the driver circuit, the diodes 46 of high breakdown voltage are inserted between the input terminal of the gate driver IC 30 and the photocoupler 38, similarly to the circuit shown in FIG. 3, in order to prevent the failure of the photocouplers 38. Further, a capacitor 48 and a resistor 50 are connected in parallel between a line from one of the diodes 46 to the relevant gate driver IC 30 and the ground. The capacitor 48 operates as an input filter.

When the capacitor 48 is inserted at the side for receiving a signal of each gate driver IC 30, if the light-receiving transistor in the photocoupler 38 becomes L level, a response is delayed due to discharge of the capacitance via the pull-down resistor having a relatively high resistance provided in the gate driver IC 30 until the input signal of the gate driver IC 30 becomes L level. Then, the resistor 50 is provided in parallel to the capacitor 48 in order to shorten the delay time. The time constant of the response due to the capacitor 48 and the resistor 50 may be determined according to a desired response time.

It is also advantageous to provide a combination of the first embodiment for the power source terminal with the second or third embodiment for the input terminals. In the combination, the influence of the surge voltage and surge current in the power module 10 to a peripheral circuit can be prevented substantially completely.

For example, FIG. 5 shows a three-phase motor driver circuit as a combination of the first and second embodiments.

In the driver circuit, a common diode 32 of high breakdown voltage is provided between a controlled power source 34 and gate driver ICs 28, 30. The diode 32 is connected not only to each gate driver IC 30 in the lower arm as shown in FIGS. 1 and 2, but also to each gate driver IC 28 in the higher arm. Further, diodes 36 of high breakdown voltage are provided between the microprocessor 20 and the gate driver ICs 30 in the lower arm. Further, diodes 36 of high breakdown voltage are also provided between the microprocessor 20 and the gate driver ICs 28 in the higher arm. The details of the functions thereof are already explained in each embodiment.

In the above-mentioned embodiments, the power modules are explained mainly. However, a power semiconductor device may also be fabricated by integrating the circuit elements included in one of the power modules with the DC power source 12, 14. When such an integrated power semiconductor device is used, wiring therefor becomes easier, and an apparatus using the integrated power semiconductor device can be assembled more easily.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A power semiconductor device comprising:
    a first power switching semiconductor element at a high voltage side and a second power switching semiconductor element at a low voltage side connected in series, one end of each of said first and second power switching semiconductor elements being connected to an external direct current power source, and a connection point between another end of each of said first and second power switching semiconductor elements being able to supply an output voltage;
    flywheel diodes each being respectively connected in anti-parallel to one of said first and second power switching semiconductor elements;
    a first driver circuit connected to a gate of said first power switching semiconductor element;
    a second driver circuit connected to a gate of said second power switching semiconductor element;
    a second diode connected to a line to be connected between a controlled power source and a power source terminal of at least one of said first and second driver circuits in a forward direction such that a current does not flow in the line from the power source terminal through said second diode toward said controlled power source;
    a control signal generating circuit for generating a control signal for at least one of said first and second driver circuits, at least one of said first and second driver circuits comprising an input terminal for receiving the control signal for the at least one of said first and second driver circuits; and
    a third diode connected to another line to be connected between said control signal generating circuit and the input terminal of at least one of said first and second driver circuits in a forward direction to prevent a current from flowing in the other line from the input terminal through said third diode toward said control signal generating circuit,
    wherein a breakdown voltage of said second diode is larger than a direct current voltage to be applied to said first and second power switching semiconductor elements by the external direct current power source, and the direct current voltage is larger than a voltage applied at the power source terminal of the at least one of said first and second driver circuits.

2. The power semiconductor device according to claim 1, further comprising a photocoupler having a first end connected to said control signal generating circuit for receiving the control signal from said control signal generating circuit, and a second connected to said third diode for supplying the control signal to the input terminal of at least one of said first and second driver circuits.

3. The power semiconductor device according to claim 2, further comprising a capacitor and another resistor connected to a point between said third diode and the input terminal, and connected in parallel to a ground of the power semiconductor device.

4. The power semiconductor device according to claim 1, wherein the at least one of said first and second driver circuits comprises said second driver circuit.

5. The power semiconductor device according to claim 1, wherein the at least one of said first and second driver circuits comprises said first and second driver circuits.

6. The power semiconductor device according to claim 1, wherein said first and second power switching semiconductor elements are metal oxide semiconductor field effect transistors or insulated gate bipolar transistors.

7. The power semiconductor device according to claim 1, wherein the power semiconductor device is a three-phase power semiconductor device including three combinations of said first and second power switching semiconductor elements and said first and second driver circuits.

8. The power semiconductor device according to claim 1, wherein the direct current power source applies the direct current voltage to said first and second power switching semiconductor elements connected in series via the one end of each of said first and second power switching semiconductor elements.

9. The power semiconductor device according to claim 1, wherein:
    said controlled power source is connected to each of said first and second driver circuits by the line;
    each of said first and second driver circuits comprises a power source terminal; and
    said second diode is connected to the line to be commonly connected between said power source terminal of each of said first and second driver circuits and said controlled power source in a forward direction to prevent a current from flowing in the line from said power source terminal of each of said first and second driver circuits toward said controlled power source.

10. The power semiconductor device according to claim 9, wherein a breakdown voltage of said third diode is larger than the direct current voltage to be applied to said first and second power switching semiconductor elements by the external direct current power source, and the direct current voltage is larger than a voltage applied at the power source terminal and the input terminal of said first and second driver circuits.

11. The power semiconductor device according to claim 1, wherein the connection point between the other end of each of said first and second power switching semiconductor elements is configured to supply an output voltage to a load external to the power semiconductor device.

12. The power semiconductor device according to claim 11, wherein the load external to the power semiconductor device is connected to the connection point between the other end of each of said first and second power switching semiconductor elements independently from the external direct current power source.

13. The power semiconductor device according to claim 1, further comprising:
    a resistor which is connected in series between the one end of said second power switching semiconductor element and a low level side of the direct current power source and through which a current flows between the low level side of the direct current power source and said second power switching semiconductor element,
    wherein a voltage across said resistor connected in series between the one end of said second power switching semiconductor element and the low level side of the direct current power source defines said current flowing between the low level side of the direct current power source and said second power switching semiconductor element.

14. A power semiconductor device comprising:
    a first power switching semiconductor element at a high voltage side and a second power switching semiconductor element at a low voltage side connected in series, one end of each of said first and second power switching semiconductor elements being connected to an external direct current power source, and a connection point between another end of each of said first and second power switching semiconductor elements being able to supply an output voltage;
    flywheel diodes each being respectively connected in antiparallel to one of said first and second power switching semiconductor elements;
    a first driver circuit connected to a gate of said first power switching semiconductor element;
    a second driver circuit connected to a gate of said second power switching semiconductor element;
    a photocoupler for supplying a control signal for at least one of said first and second driver circuits, said photocoupler having a first end connected to a terminal of at least one of said first and second driver circuits for receiving the control signal from said photocoupler, and a second end connected to a line to be connected to an external circuit;
    a second diode connected between said first end of said photocoupler and the terminal of at least one of said first and second driver circuits in a forward direction such that a current does not flow in the line toward the external circuit from the terminal through said photocoupler,
    wherein a breakdown voltage of said second diode is larger than a direct current voltage to be applied to said first and second power switching semiconductor elements by the external direct current power source, and the direct current voltage is larger than a voltage applied at the terminal of the at least one of said first and second driver circuits.

15. The power semiconductor device according to claim 14, wherein the external circuit is a controlled power source, the terminal comprises a power source terminal, and said second diode is connected between the power source terminal and said first end of said photocoupler to prevent a current from flowing in the line toward said controlled power source from said power source terminal.

16. The power semiconductor device according to claim 14, wherein the external circuit is a control signal generating circuit for generating the control signal for at least one of said first and second driver circuits, the terminal comprises an input terminal for receiving the control signal for the at least one of said first and second driver circuits via said first end of said photocoupler, and said second diode is connected between the input terminal and said first end of said photocoupler to prevent a current from flowing in the line toward said controlled power source from said input terminal.

17. The power semiconductor device according to claim 14, further comprising a capacitor and a resistor connected to a point between said second diode and the terminal, and connected in parallel to a ground of the power semiconductor device.

18. The power semiconductor device according to claim 14, wherein the at least one of said first and second driver circuits comprises said second driver circuit.

19. The power semiconductor device according to claim 14, wherein the at least one of said first and second driver circuits comprises said first and second driver circuits.

20. The power semiconductor device according to claim 14, wherein said first and second power switching semiconductor elements are metal oxide semiconductor field effect transistors or insulated gate bipolar transistors.

21. The power semiconductor device according to claim 14, wherein the power semiconductor device is a three-phase power semiconductor device including three combinations of said first and second power switching semiconductor elements and said first and second driver circuits.

22. The power semiconductor device according to claim 14, wherein the direct current power source applies the direct current voltage to said first and second power switching semiconductor elements connected in series via the one end of each of said first and second power switching semiconductor elements.

23. The power semiconductor device according to claim 14, wherein the connection point between the other end of each of said first and second power switching semiconductor elements is configured to supply an output voltage to a load external to the power semiconductor device.

24. The power semiconductor device according to claim 14, wherein the load external to the power semiconductor device is connected to the connection point between the other end of each of said first and second power switching semiconductor elements independently from the external direct current power source.

25. The power semiconductor device according to claim 14, further comprising a resistor which is connected in series between the one end of said second power switching semiconductor element and a low level side of the direct current power source and through which a current flows between the low level side of the direct current power source and said second power switching semiconductor element.

26. The power semiconductor device according to claim 25, wherein a voltage across said resistor connected in series between the one end of said second power switching semiconductor element and the low level side of the direct current power source defines said current flowing between the low level side of the direct current power source and said second power switching semiconductor element.

* * * * *